United States Patent Office 3,347,294
Patented Oct. 17, 1967

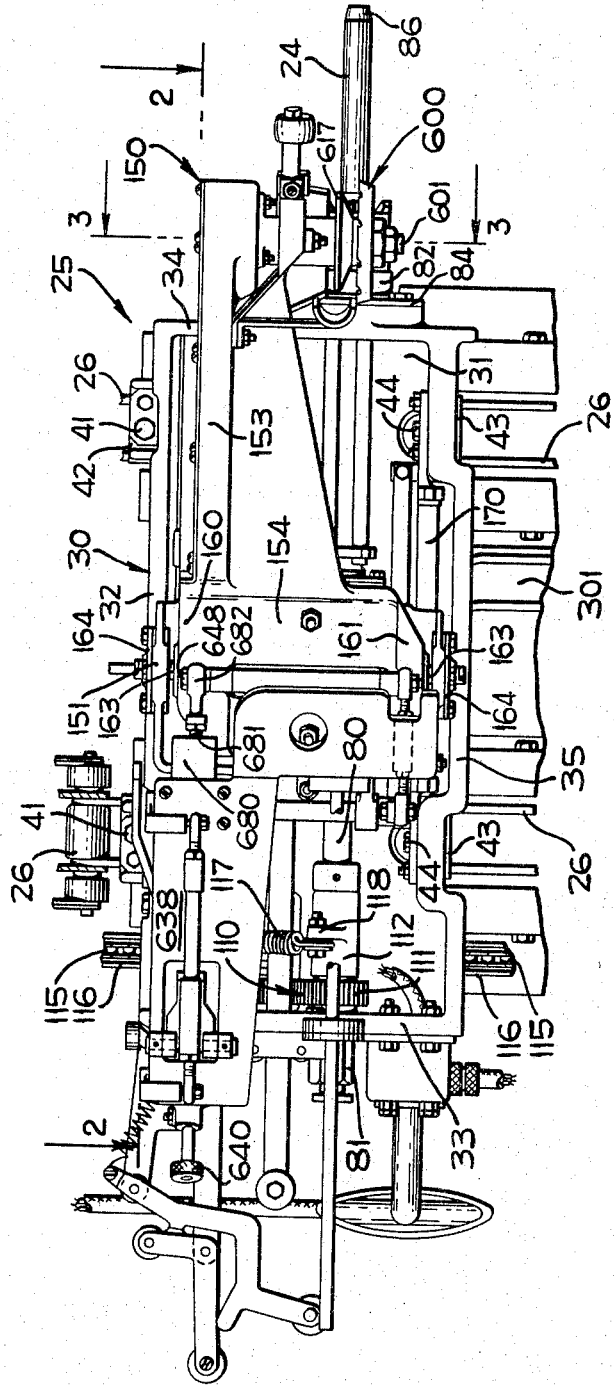

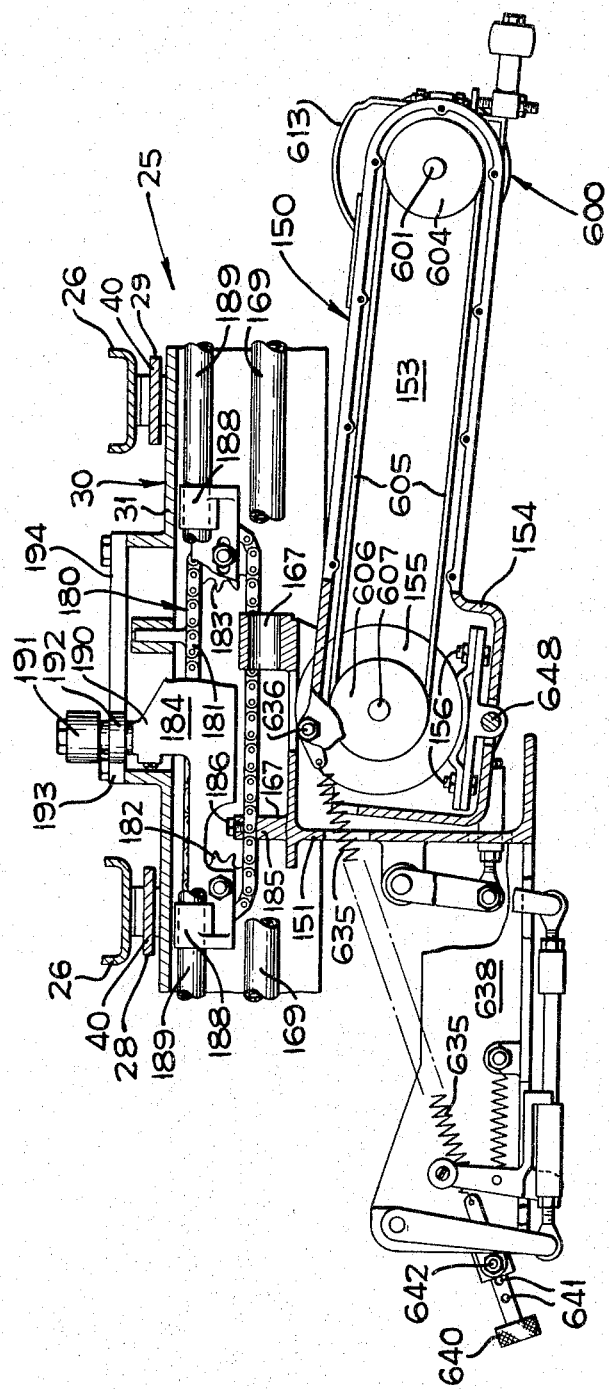

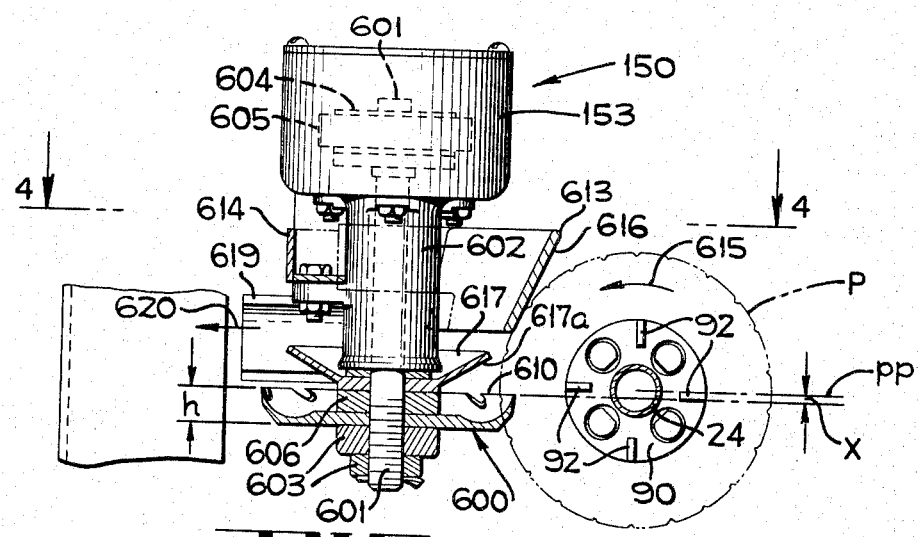
FIG_3
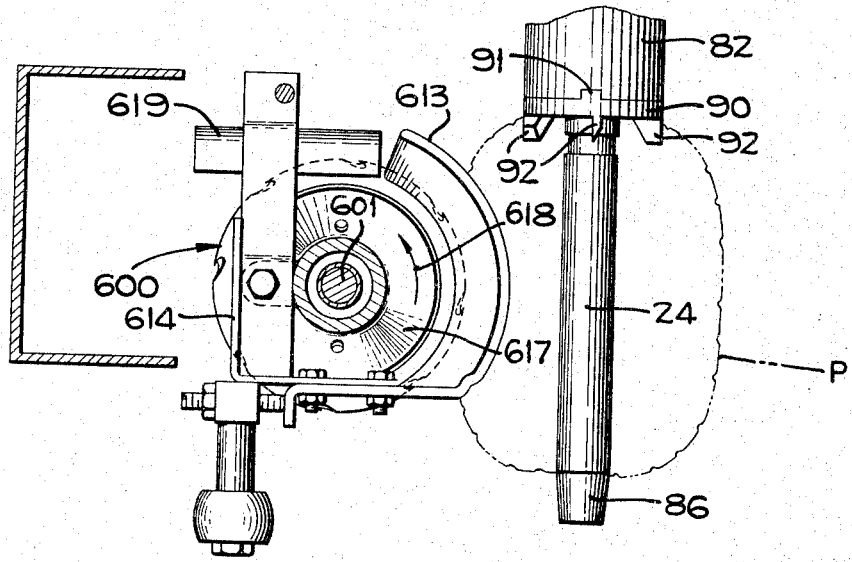
FIG_4

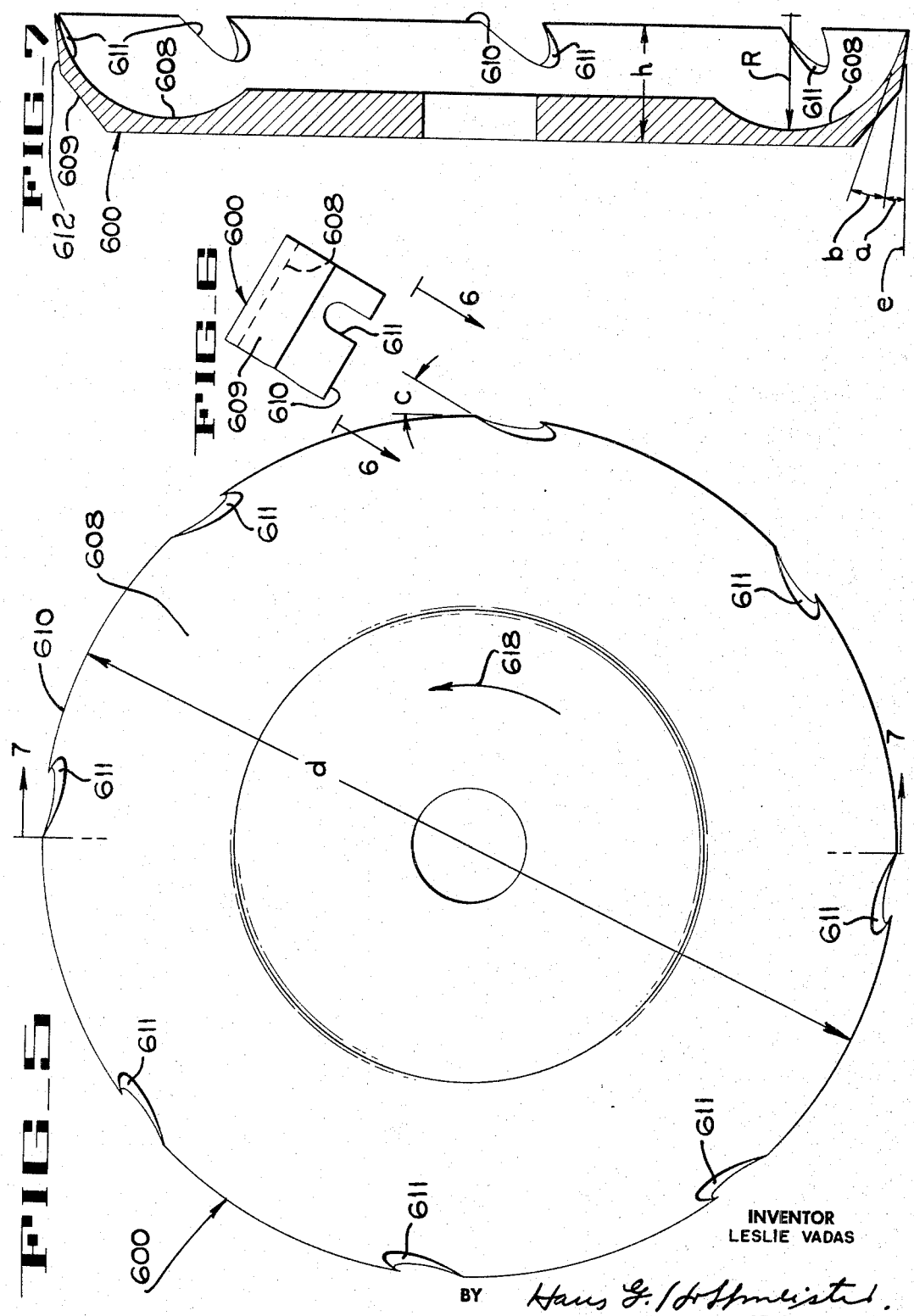

3,347,294
PINEAPPLE PEELING MACHINE
Leslie Vadas, Los Gatos, Calif., assignor to FMC Corporation, San Jose, Calif., a corporation of Delaware
Filed July 28, 1965, Ser. No. 475,441
8 Claims. (Cl. 146—6)

ABSTRACT OF THE DISCLOSURE

Pineapples are peeled by a disc-like cutter having an arcuate groove for smooth curling and directing continuous peeled strips and rotating at a peripheral velocity of six to eight thousand feet per minute.

---

This invention relates to fruit processing apparatus and particularly concerns an improved method for contour-peeling pineapples and an apparatus for carrying out the method.

The present application is a continuation-in-part of my pending application for U.S. Letters Patent, Ser. No. 414,121 for Method of and Apparatus for Processing Fruit, filed Nov. 27, 1964, in that the present application discloses an improved cutter that can be substituted for the cutter of the machine of said application and in that the present application concerns further detail concerning the coaction of the improved apparatus with the apparatus of the machine disclosed in said application. Accordingly, it will be understood that the entire specification of said application Ser. No. 414,121 is incorporated by reference in the present application for a disclosure of the parts of the machine not specifically described herein.

In accordance with the present invention pineapples are strip-peeled as opposed to merely removing the outer shell to salvage the cylinders for slicing the slices. The purpose of strip peeling the pineapples is to remove first the peel and then at least one layer of flesh underneath the peel. If this can be done, the peel material can be collected separately for conversion into cattle feed whereas the underlying flesh material which has eyes or the like therein can be used for juice. The problem is to remove the peel in continuous strips by undercutting the skin and removing it without causing the removed strip to jam or clog the cutting elements and without causing the fruit to juice excessively during the peeling. Briefly, this is accomplished by providing a cutting knife having relatively smooth edge in engagement with the fruit which prevents juicing and a curved or re-entrant face that receives the strip cuts in the pineapple and causes it to curl around and leave the area of the cutting zone continuously and smoothly. Furthermore, in accordance with the present invention, the knife is operated at a relatively high peripheral speed, namely in the order of six to eight thousand feet per minute and the pineapple is rotated against this rapidly rotating knife at a speed high enough to insure smooth and efficient cutting without centrifugal fragmentation of the pineapple. This peripheral speed of the pineapple is in the order of 250 feet per minute.

Other and further objects, features and advantages of the present invention will be apparent from the following description taken in connection with the attached drawings, in which:

FIGURE 1 is a diagrammatic side elevation of a peeling head constructed in accordance with the teachings of the present invention, the support structure of the machine and the apparatus for moving the head through the machine being shown in the background.

FIGURE 2 is a section taken along line 2—2 of FIGURE 1.

FIGURE 3 is an enlarged section taken along line 3—3 of FIG. 1.

FIGURE 4 is a section taken along line 4—4 of FIG. 3.

FIGURE 5 is an enlarged diagrammatic plan of the cutter used in the head shown in FIGS. 1 and 2.

FIGURE 6 is a fragmentary elevation of a portion of the cutter of FIG. 5, the view being taken looking in the direction of lines 6—6 of FIG. 5.

FIGURE 7 is a diagrammatic section taken along lines 7—7 of FIG. 5.

In FIGURES 1 and 2 the reference numeral 25 indicates generally a processing unit or head which is substantially identical to each of the twenty-two heads mounted in the machine disclosed in my above-mentioned application. Each head is mounted on two vertically moving spaced, endless chains 26 which are trained around sprockets that are secured to a sleeve. The sleeve is keyed to a shaft driven by an electric motor so that, when the motor is energized, the head is moved along an endless path having relatively long ascending and descending runs. Accordingly, each head is first moved along its ascending run to a feed station where a pineapple is moved endwise onto a rotatable coring tube 24 of the head to a position substantially as shown in phantom lines in FIG. 4. While the pineapple is carried in impaled condition on the coring tube, various mechanisms of the machine are effective to remove and separately collect the peel of the pineapple, cut off the ends of the pineapple, remove the core, and finally discharge the cored, peeled and trimmed pineapple at a discharge station.

The present invention provides an improved cutter for the head and discloses an improved method of peeling pineapples which involve specific speed ranges for various mechanisms of the machine. Since the specific cutter of the present invention is the only structure not disclosed in my above-mentioned pending application, the disclosure of the present application will be limited to the new structure and to the parts of the previous machine associated directly with the cutter, it being understood that the disclosure of the pending application may be referred to for an understanding of the entire machine.

The head 25 comprises a main housing 30 having a closed rear wall 31 (FIG. 2) and an open forward side defined by a top wall 32 (FIG. 1), side walls 33 and 34, and a bottom wall 35. The housing is mounted on the chains 26 by means of two brackets 28 and 29 (FIG. 2), each bracket having an arm 40 secured to the housing by a bolt 41 (FIG. 1) that engages a flange 42 on the top wall of the housing. A second arm 43 of the bracket underlies the housing and is secured to the bottom wall 35 by a bolt 44.

The coring tube 24 is part of a coring unit which includes a tubular shaft 80 that has one end locked by means of a nut 81 to the inner race of a ball bearing unit whose outer race is fixed in the side wall 33. The opposite end of the shaft 80 fits snugly in a hole in a guide housing 82 (FIG. 4) that is pressed in the inner race of a bearing unit whose outer race is pressed in the side wall 34. The guide housing is bolted to a circular flange carried by shaft 80 so that rotation of the shaft causes rotation of the guide housing. A retainer plate 84 (FIG. 1) bears against the outer race of the bearing unit to help retain it in place.

The coring tube has a sharpened outer end 86 (FIG. 4) and an inner threaded end that is screwed into the central portion of the guide housing 82. The coring tube has a circular flange (not shown) adjacent its inner end that engages an inner peripheral area of a prong carrier 90 to lock the prong carrier to the guide housing in which the coring tube is threaded. The carrier 90 has several projections 91 (FIG. 4) that engage indents in the housing 82 to cause the housing to drive the prong carrier, whereby a pineapple, that is impaled on the coring tube and having the prongs 92 of the carrier projecting therein, is rotated when the shaft 80 is rotated.

The shaft 80 is driven by a gear train 110 (FIG. 1) which includes a gear 111 keyed to the shaft 80. The gear train includes a hub 112 that is rotatably journalled on shaft 80 and has two gear-mounting arms, one arm carrying a sprocket and a coaxial drive gear that are secured together, and the other arm carrying a small gear that meshes with the gear 111 on shaft 80 and with the gear which is secured to the sprocket. The arrangement is such that when the sprocket is rotated the gear train is actuated to rotate shaft 80.

The sprocket is rotated due to its engagement with a chain 115 that is secured in fixed position in a fixed channel 116 of the frame of the machine. A spring 117, that is connected between an arm 118 projecting from the hub 112 and a fixed flange plate of the housing 30, rotates the hub in a direction to maintain the sprocket in engagement with the fixed chain 115. Accordingly, as the head is moved vertically in the machine, the sprocket and the coring tube which is driven thereby, are continuously rotated.

A cutter unit 150 (FIGS. 1 and 2) is pivotally mounted on a bracket 151 which is, in turn, mounted in the main housing 30 for reciprocating movement in a direction parallel to the axis of shaft 80. The cutter unit has an elongate rigid one-piece housing 153 that has an enlarged rear portion 154 in which an electric motor 155 is mounted by bolts 156. The cutter unit housing 150 has an upper wall 160 and a lower wall 161 which have aligned openings in which the outer races of bearing units are pressed. The inner race of each bearing unit receives a smooth end of a screw 163 that is threaded through a plate 164 that is bolted to the bracket 151. The screws 163 are locked in place by lock nuts. Accordingly, the cutter housing 153 is mounted in the main housing 30 for pivotal movement about an axis defined by the two screws 163.

The bracket 151 on which the cutter housing is mounted has a pair of upper tubular bosses 167 that are slidable on a fixed rod 169 which is mounted in the main frame 30 parallel to the shaft 80. A plurality of rollers (not shown) are secured to the lower end of the bracket 151 and are disposed in guided relation on a rod 170 (FIG. 1) that is also fixed in the main frame and is parallel to the guide rod 169. Movement of the bracket 151 longitudinally of the housing 30 is carried out by a chain mechanism 180 that includes a chain 181 which is trained around two sprockets 182 and 183 that are rotatably mounted on a plate 184. The chain passes through an opening in a flange 185 on one of the bosses 167 and is secured to the bracket by a screw 186 that extends through the chain and is threaded into the flange 185. The plate 184 has a pair of tubular bosses 188 that are slidably journalled on a fixed rod 189, and an arm 190 of the plate carries a cam follower roller 191 and a roller 192 that rolls along a slot 193 formed by two closer plates 194 of the housing 30. The cam follower 191 is moved back and forth from left to right (FIG. 2) as the processing head moves through the machine. Movement to the right, positions a cutter 600 carried by the housing 153 opposite the right hand end of a pineapple on the coring tube 24. Movement of the cam follower 191 to the left causes the cutter to move longitudinally of the coring tube along the surface of the pineapple to peel it. The back and forth movement of cam follower 191 is effected by a fixed cam 301 (FIG. 1) which is mounted on the frame of the machine. The plate 184 is moved longitudinally in the housing 30 and, through the chain 181, causes movement of the cutter unit 150 longitudinally of the housing at twice the speed of movement of the plate 184.

The peeling cutter 600 (FIG. 3) is keyed to a shaft 601 that is journalled for rotation in a boss 602 bolted to the housing 153. A pair of nuts 603 and a spacer 606 position the cutter on the shaft 601. A pulley 604 (FIG. 2) is keyed to shaft 601 internally of the housing 153, and a belt 605 is trained around the pulley 604 and around a pulley 606 that is keyed to shaft 607 of the motor 155. Thus, when the motor is energized, the cutter 600 is continuously rotated. As seen in FIGS. 5 and 7, the cutter is a generally disc-shaped member having a shallow trough 608 formed in one surface and a composite frusto-conical peripheral portion 609 on which a circular cutting edge 610 is formed, said edge having a plurality of narrow notches 611 forming cutting teeth. Since the notches 611 are narrow (FIG. 6), the generally axially extending, radially outer frusto-conical surfac 612 (forming part of the composite peripheral portion 609 and being the surface which is pressed against the pineapple) is relatively smooth and uninterrupted. A gauge 613 is mounted on a bracket 614 that is bolted to boss 602, said gauge having a fragmentary frusto-conical surface 616 which engages the surface of a pineapple P (shown in phantom lines) that is being rotated in the direction of arrow 615. The gauge 613 determines the depth of the cut made by the cutter 600. A deflector plate 617 is keyed to the shaft 601 and is provided with a frusto-conical surface 617a overlying the trough 608 in the cutter 600. The shaft 601, the cutter, and the deflector rotate in the direction of arrow 618 (FIG. 4). Accordingly, a more or less continuous peel is cut from the pineapple. The peel is directed upwardly into contact with the deflector plate 617. Due to the fact that the contact surface of the deflector is moving rearwardly, as also is the contact surface of the peeling cutter, the peel will be carried rearwardly against a curved plate 619 that is also mounted on bracket 614 and is effective to redirect the peel so that it moves in the direction The diameter and other dimensions of the cutter may vary according to the size of the pineapple that is being peeled. In one successful installation, the diameter was 3¾ inches, the height $h$ (FIG. 3) was ¼ inch, and the angle $a$ (FIG. 7) was between 3 and 4 degrees. Also, the distance X between a plane passing through the cutting edge 610 and a transverse plane $pp$ passing through the axis of the coring tube was ⅛ inch.

In the embodiment shown, eight notches 611 providing light equi-spaced teeth are provided, however, the teeth may vary in number from 8 to 12. When less than eight teeth are used, the cutter does not cut clean; when more than twelve teeth are used, an excessive amount of juice is released.

In the preferred arrangement, the front clearance angle $a$ (FIG. 7) was 7 degrees, the cutting edge angle $b$ was 12 degrees, and the tooth angle $c$ (FIG. 5) was 30 degrees. The angle $a$ of the surface 612 may vary from 0 to 15 degrees, however, the closer the surface of the cutter approaches to a zero degree position, i.e., a position wherein the surface is on line $e$ parallel to the cutter axis (FIG. 7), the greater will be the tendency of the rotating pineapple to move the cutter out of peeling engagement. The tooth angle $c$ may vary from 15 to 45 degrees.

The height $h$ preferably can be ½ inch, but can be anywhere in the range of from ³⁄₁₆ of an inch to ½ inch. The radius R of the annular groove formed in the cutter adjacent the cutting edge should be about ½ inch. The height $h$ and the radius R should be chosen so that the peel will be progressively and smoothly guided inwardly without causing an abrupt turning of the peel that would occur if a groove of extremely small radius is used.

The cutter may be rotated in the range of speeds which will result in peripheral speeds of from 6000 to 8000 feet per minute. If peripheral speeds below 6000 f.p.m. are used, the cutter does not cut clean and the force of the cutter bearing on the fruit becomes excessive, while at speeds in excess of 8000 f.p.m. the fruit begins to release juice excessively.

The pineapple may be rotated at speeds up to the point where the periphery of the pineapple moves at 250 feet per minute. It has been found that when faster speeds are used, stresses build up in the pineapple and it tends to break up or fly apart.

The lead of the cutter, i.e., the amount of movement of the cutter longitudinally of the fruit may be in the range of from 3/8 inch to 7/8 inch of longitudinal movement per revolution of the pineapple, with 5/8 inch per revolution being preferred.

The diameter d (FIG. 5) of the cutter may range from 2½ inches to 5 inches. Since cutters of small diameter follow the contour of the pineapple better than cutters of larger diameter, the smallest cutter that attains a proper peripheral velocity at a practicable rotary speed should be used.

The cutter housing 150 (FIG. 2) is caused to pivot counterclockwise, to move the cutter 600 into engagement with the pineapple, by a spring 635 that is connected between a stud 636 projecting up from the housing 150 and an extension 638 of the bracket 151. The spring is adjustably connected to the bracket extension 638 by means of a pin 640 that has several spaced apertures 641 through which a bolt 642 extends to lock the pin on the bracket.

In order to resist the tendency of the gauge 613 to bounce as it moves longitudinally along the surface of the pineapple, a damping mechanism is provided in the form of a hydraulic cylinder 680 (FIG. 1) which has a piston rod 681, pivotally connected at 682 to a rod 648 (FIG. 2) mounted in the enlarged end 154 of the cutter housing 153. The cylinder itself is pivoted to the bracket extension 638. Suitable conduits are provided to establish flow communication between the chambers of the cylinder on opposite sides of the piston in the chamber. A check valve and metering valve is connected in the conduits so that, when the housing is swung inwardly or counterclockwise (FIG. 2) by the spring 635, the fluid flows freely between the chambers in the cylinder and the piston rod 681 is allowed to move out of the cylinder. However, when the housing tends to swing outwardly away from the pineapple, the flow of fluid in an opposite direction is restricted to a desired quantity such that the piston rod is only allowed to move slowly into the cylinder. Thus, the damping mechanism resists the movement of the gauge and the cutter away from the pineapple. As a result, the cutter is capable of maintaining peeling contact with the pineapple in spite of the fact that the surface of the pineapple is somewhat irregular.

From the foregoing description, it will be seen that the present invention provides an improved cutter that is particularly adapted for peeling the rather tough skin of a pineapple. The disclosed front clearance angle, the cutting edge angle, and the tooth angle constitute important advances in the art of peeling pineapples which have never heretofore been successfully contour-peeled. Further, the speeds of rotation of the cutter and the pineapple taught by the present invention make possible for the first time the efficient removal of skin from pineapple without excessive loss of juice.

Having thus described the invention what I claim as new and desire to protect by Letters Patent is:

1. A pineapple peeling machine comprising means for rotating a pineapple about its core axis at a peripheral velocity not exceeding 250 feet per minute, a disc-like rotatable peeling cutter having a generally axially extending cutting edge, said cutter having a small arcuate groove formed therein for smoothly curling strips of peel removed by the cutter, means rotatably mounting said cutter for rotation about an axis that is normal to the core axis of the pineapple and with the cutting edge facing in a direction opposite to the direction of motion of the pineapple surface being cut, means for moving said cutter longitudinally along the pineapple, means for urging the cutter into peeling engagement with the pineapple, and means for rotating the cutter at a peripheral speed in the range of six to eight thousand feet per minute.

2. The pineapple peeling machine of claim 1 wherein the plane of the cutting edge of the cutter is offset by a short distance in said direction of pineapple motion.

3. A cutter for peeling pineapples or the like comprising a generally flat circular body portion having a relatively smooth, generally axially extending, radially outer surface, and means defining a shallow groove of arcuate cross-section in said body portion, the radially outer wall of said groove intersecting said generally axially extending outer surface to form a sharpened, generally axially extending cutting edge, the portion of the groove wall extending from said intersection of surfaces to the bottom of the groove having a smooth, arcuate, concave contour of about 90 degrees extent for smoothly curling and directing continuous strips of peel material radially inwardly, the portion of the groove wall extending from the bottom of the groove to the radially inner boundary of the groove having a smooth, arcuate concave contour for further smooth curling and directing of the continuous strips of peel material for discharge.

4. A peeling cutter according to claim 3 wherein said groove has a cross-section that is part of a circle formed on a radius of one-half inch, and wherein the periphery of said body portion has a height measured from the base of said body portion to said cutting edge of from 3/16 to ½ inch.

5. The cutter of claim 3, wherein the included angle of the intersecting surfaces forming said cutting edges is about twelve degrees.

6. The cutter of claim 3, wherein said cutting edge is interrupted by eight to twelve narrow notches.

7. The cutter of claim 6, wherein said notches extend inwardly from the cutting edge in the direction opposite to that of cutter rotation and at an angle of 14 to 45 degrees to a tangent line at the notches.

8. The cutter of claim 3, whereby said generally axially extending, radially outer cutter surface conveys toward the cutter axis, in a direction away from the cutting edge, by an angle of from zero to fifteen degrees.

References Cited

UNITED STATES PATENTS

| | | | |
|---|---|---|---|
| 1,590,162 | 6/1926 | Hargreaves | 146—6 |
| 3,058,502 | 10/1962 | Loveland et al. | 146—43 |
| 3,067,791 | 12/1962 | Boyce | 146—43 |

WILLIAM W. DYER, Jr., *Primary Examiner.*

WILLIE G. ABERCROMBIE, *Examiner.*